United States Patent Office.

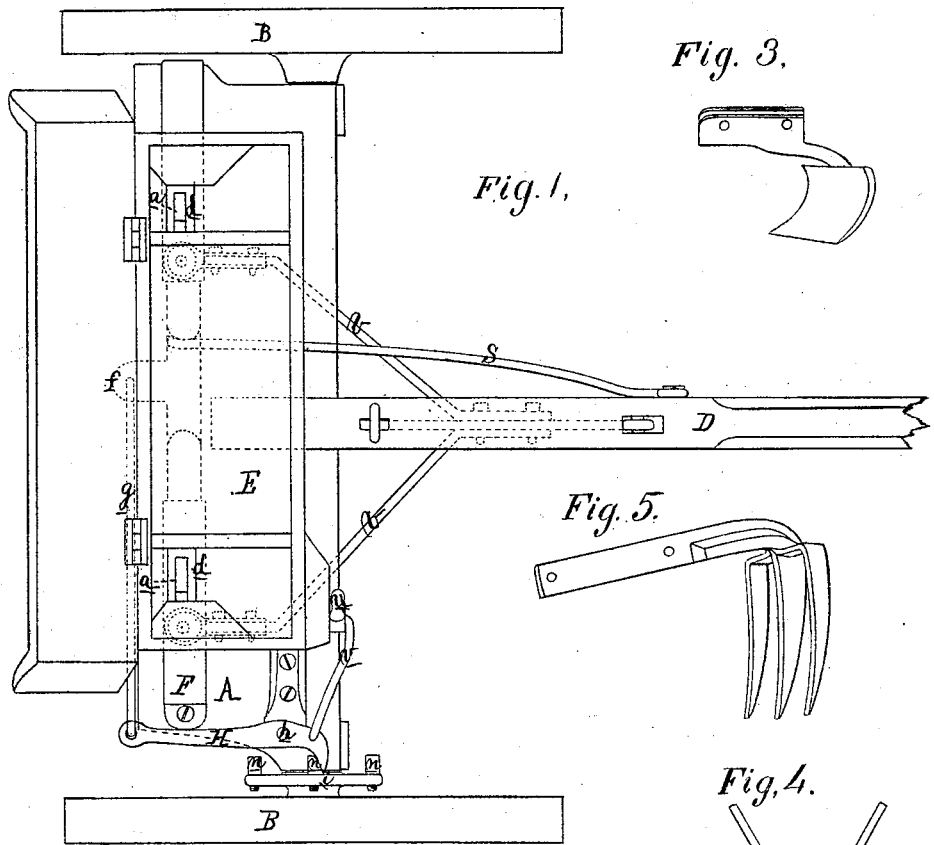
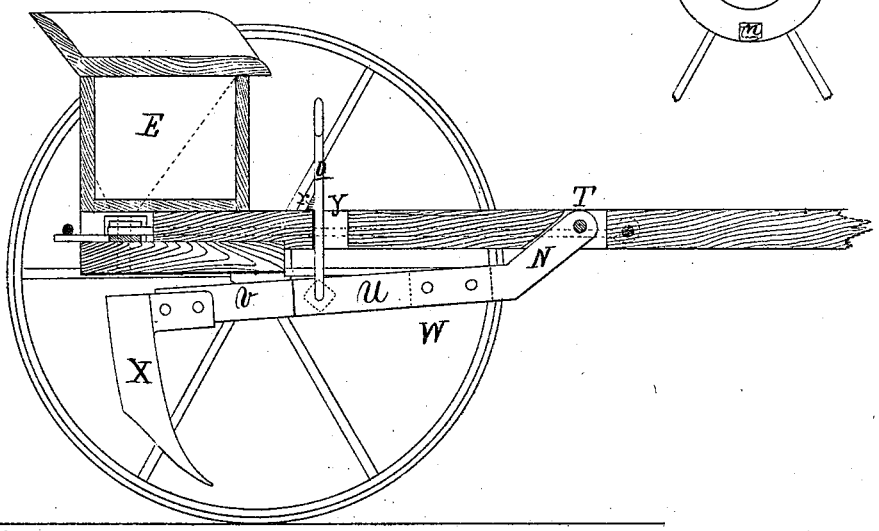

JOSEPH PATTEN CAMPBELL, OF DANVILLE, PENNSYLVANIA.

Letters Patent No. 96,883, dated November 16, 1869.

IMPROVEMENT IN CORN-PLANTER.

The Schedule referred to in these Letters Patent and making part of the same.

*To all whom it may concern:*

Be it known that I, JOSEPH PATTEN CAMPBELL, of Danville, in the county of Montour, and State of Pennsylvania, have invented a new and valuable Improvement in Corn-Planter, &c.; and I do hereby declare that the following is a full, clear, and exact description of the construction and operation of the same, reference being had to the annexed drawings, making a part of this specification, and to the letters and figures of reference marked thereon.

Figure 1, of the drawings, is a top view of my invention.

Figure 2 is a central vertical longitudinal section of the same.

Figures 3, 4, and 5, are details.

My invention relates to agricultural implements; and

It consists mainly in a novel arrangement of devices intended for use as a corn-planter, cultivator, or potato-digger, at the will of the operator.

A, of the drawings, represents a base-board, to the respective ends of which are attached arms that serve as axles for the carriage-wheels.

Letters B are the carriage-wheels, and

D, the neap-shafts, arranged for a single horse, and sometimes attached to the base-board, instead of a neap.

E represents a seed-box, subdivided into three compartments, the central or large one being designed as a reservoir, and the outer two for holding the corn, in the process of planting.

There is an opening through the bottom of each of these outer compartments, marked *a*, for the purpose of allowing the seed-corn to pass downward.

There are corresponding openings through the base-board, below the points *a*, for the same purpose.

F represent scabbards, attached to the top of the base-board, to serve as guides, for the movements of the vibrating bar *d*, next mentioned.

Letter *d* is a vibrating bar or plate, with an opening near each end, sufficiently large for kernels of corn to pass through, and has an ear, *f*, to which the rod next mentioned is attached.

The rod *g* is connected at one end by a hook, with the ear *f*, as shown, and at the other, is hinged to the lever H.

H is an elbow-lever, connected at its rear end with the rod *g*, and pivoted to the base-board at the point *h*. Its front end is turned outward, as shown, forming an elbow, with its fore-arm against a cam of the disk next described.

Letter *i* represents a disk, attached to the inside end of a wheel-hub, perforated with a series of holes, adapted to receiving and holding the removable cams, next mentioned.

These removable cams are marked *n* on the drawings, and are arranged in the disk in such numbers as may be found desirable.

Letter S is a brace or spring, extending from the vibrating bar to the neap of the carriage. It serves as a support and aid to said bar, while its movements are in progress.

I make a slot in the neap, at the point T, and pivot therein the swinging plate *n*, in the manner shown on fig. 2.

To this plate I attach the bent bars or arms V, by passing bolts or screws through the whole, as shown at the point W.

X represents the combined marker and conduit of my corn-planter,

I place one of these conduits upon the rear end of each of the arms *v*, by passing screws through the openings in the flanches thereof, similar openings being made for that purpose in said arms respectively.

By using screws for the purpose last named, the conduits are made removable at will.

Fig. 3 is a representation of one of my cultivator-plows, which, when desired for use, I substitute for the conduits upon the arms V.

My fork, for digging potatoes, is shown on fig. 5. I substitute it for the conduit or plow, at will, upon the arm V, the mode of attachment, both with the fork and the plow, being the same as with the conduit.

It will readily be seen that in planting corn, the distance of the hills from each other in the rows may be regulated at will by the number of cams the operator shall place in the disk *i*.

In order to aid in the movements of the vibrating bar, I pivot a lever, *u*, to the front side of the box, and connect it with the lever H, by the rod *v*. This lever *u* is operated by hand.

The seed-box is attached to the base-board by one or more screws, and hence is removable at will.

In order to hold the conduits up to duty, and also to provide means for lowering the plows and forks, when the same are attached, I make a slotted opening through the neap, at the point *y*, and pass therethrough a rod, *o*, which rod is attached at its lower end to the rear end of plate U, as shown.

I attach a cleat, *r*, to the rear side of this rod, and when I desire to hold the conduits up against the bottom of the base-board, to receive the seed passing from the box, I raise the rod perpendicularly until the cleat is brought above the slot, when I draw the rod rearward, and make the cleat secure.

When the plows or forks are attached, the devices last named enable the operator to suspend the same from the ground for purposes of transportation.

What I claim as my invention, and desire to secure by Letters Patent, is—

1. The combination and arrangement of the removable cams $n$, disk $i$, levers H and $u$, with the seed-box E, base-board A, and vibrating bar $d$, as and for the purposes specified.

2. The bars $n$, $u$, and $v$, adapted to receive the conduits X, plows, fig. 3, and rakes, fig. 5, constructed and arranged as described.

In testimony that I claim the above, I hereunto subscribe my name, in the presence of two witnesses.

J. PATTEN CAMPBELL.

Witnesses:
PAUL LEIDY,
THOMAS CHALFANT.